United States Patent
Feng et al.

(10) Patent No.: US 10,142,319 B2
(45) Date of Patent: *Nov. 27, 2018

(54) PROTECTING NETWORK COMMUNICATION SECURITY

(71) Applicant: International Business Machines Corporation, Armonk, NY (US)

(72) Inventors: Yi Cheng Feng, Zhouxiang (CN); Jun Liao, Shanghai (CN); Wen Bao Yin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/846,507

(22) Filed: Dec. 19, 2017

(65) Prior Publication Data

US 2018/0115544 A1   Apr. 26, 2018

Related U.S. Application Data

(63) Continuation of application No. 14/751,362, filed on Jun. 26, 2015, now Pat. No. 9,860,232.

(30) Foreign Application Priority Data

Jul. 28, 2014   (CN) .......................... 2014 1 0364774

(51) Int. Cl.
   *H04L 29/06*   (2006.01)

(52) U.S. Cl.
   CPC ................. *H04L 63/0807* (2013.01)

(58) Field of Classification Search
   CPC ........................ H04L 63/08; H04L 63/0807

(Continued)

(56) References Cited

U.S. PATENT DOCUMENTS

| 5,916,309 A * | 6/1999 | Brown ................. G06F 5/065 |
| | | 348/116 |
| 9,811,261 B1 * | 11/2017 | Ramani ............... G06F 3/0608 |

(Continued)

FOREIGN PATENT DOCUMENTS

| CN | 101064695 A | 10/2007 |
| CN | 101741851 A | 6/2010 |

(Continued)

OTHER PUBLICATIONS

Pelizzi et al., "A Server- and Browser-Transparent CSRF Defense for Web 2.0 Applications," Proceedings of the 27th Annual Computer Security Applications Conference (ACSAC'11), Dec. 2011, pp. 257-266.

(Continued)

*Primary Examiner* — Jahangir Kabir
(74) *Attorney, Agent, or Firm* — Yee & Associates, P.C.; Robert Shatto

(57) ABSTRACT

A method and apparatus for protecting a network communication security. In one embodiment, there is provided a method for protecting network communication security at a server. The method comprises: in response to a request from a client, determining whether a token from the client is included in a valid token queue, the valid token queue being a First-In-First-Out queue; in response to the token being included in the valid token queue, managing the valid token queue based on a position of the token in the valid token queue; and sending a response to the client based on the managing of the valid token queue. There is further disclosed a corresponding method and apparatuses at client side.

13 Claims, 4 Drawing Sheets

(58) Field of Classification Search
USPC .......................................................... 726/2, 9
See application file for complete search history.

(56) References Cited

U.S. PATENT DOCUMENTS

| | | |
|---|---|---|
| 2004/0003104 A1 | 1/2004 | Boskovic et al. |
| 2005/0091239 A1 | 4/2005 | Ward et al. |
| 2006/0092934 A1* | 5/2006 | Chung ................ H04L 47/2441 370/389 |
| 2009/0209314 A1 | 8/2009 | Rybak |
| 2010/0278190 A1 | 11/2010 | Yip et al. |
| 2012/0023377 A1 | 1/2012 | Garskof |
| 2012/0054846 A1 | 3/2012 | Lightsey |
| 2012/0110318 A1 | 5/2012 | Stone |
| 2012/0137363 A1 | 5/2012 | Meliksetian et al. |
| 2013/0019308 A1 | 1/2013 | Meliksetian et al. |
| 2013/0160132 A1 | 6/2013 | Genova et al. |
| 2014/0082710 A1 | 3/2014 | Lu et al. |
| 2014/0137248 A1 | 5/2014 | Gajda et al. |
| 2014/0282988 A1 | 9/2014 | Gargate |
| 2016/0028707 A1 | 1/2016 | Feng et al. |

FOREIGN PATENT DOCUMENTS

| | | |
|---|---|---|
| CN | 102006171 A | 4/2011 |
| CN | 102480490 A | 5/2012 |
| CN | 103051460 A | 4/2013 |
| CN | 103312666 A | 9/2013 |
| EP | 2611102 A1 | 7/2013 |

OTHER PUBLICATIONS

Son, "Prevent Cross-site Request Forgery: PCRF," University of Texas, 10 pages. No date. http://www.cs.utexas.edu/users/samuel/PCRF/Final_PCRF_paper.pdf.

Xia et al., "Queuing analysis and performance evaluation of workflow through WFQN", First Joint IEEE/IFIP Symposium on Theoretical Aspects of Software Engineering, 2007, 10 pages.

Rao et al., Analysis of Channel Conditions based on Bandwidth and Fairness of 802.16 Wi Max Networks, IEEE International Conference on Advances in Engineering, Science and Management, Mar. 30-31, 2012, 9 pages.

Dong et al., "A New Active Queue Management Scheme Based on Packet Loss Ratio", IEEE ICSP Proceedings, 2006, 4 pages.

Office Action, dated Sep. 15, 2016, regarding U.S. Appl. No. 14/751,362, 23 pages.

Final Office Action, dated Feb. 3, 2017, regarding U.S. Appl. No. 14/751,362, 34 pages.

Notice of Allowance, dated Aug. 21, 2017, regarding U.S. Appl. No. 14/751,362, 20 pages.

List of IBM Patents and Applications Treated as Related, dated Dec. 19, 2017, 2 pages.

Chinese Office Action and Search Report, dated Jan. 19, 2018, regarding Application No. 201410364774.2, 5 pages. English Translation Unavailable.

* cited by examiner

PROTECTING NETWORK COMMUNICATION SECURITY

CROSS REFERENCE TO PARENT APPLICATION

This application is a continuation of and claims priority to the following U.S. Patent Application entitled "Protecting Network Communication Security," Ser. No. 14/751,362, filed Jun. 26, 2015, now U.S. Pat. No. 9,860,232, issued Jan. 2, 2018, which is incorporated herein by reference.

BACKGROUND

Embodiments of the present invention generally relate to the network technology, and more specifically, relate to a method and apparatus for protecting network communication security.

In network communication, a common malicious attack is forging a legal request or command. For example, CSRF (Cross-Site Request Forgery) is an example of such malicious attack. A general practice of a CSRF attack is providing a user a message containing a link or a script. If the user clicks onto the link or triggers execution of the script, an unauthorized request will be sent to a website that has completed authentication of the user. At this point, from the perspective of the website, the request is a legal request sent by an authorized user. Therefore, the request involved in the request will be executed. In this way, the CSRF attacker may achieve an illegal objective by forging a request from the authorized user.

As an example, suppose a user is accessing a website containing its personal information. After the user passes the authentication, the website provides the user a token to be used in subsequent network session. The token, for example, may be saved in the cookie by the Web browser. At this point, the attacker may send a CSRF attack message to the user. The attack message may be a link, text, image or any other format. If the user triggers the CSRF attack message, for example, clicking onto the link or triggering execution of the script, the request for the user's personal information may be sent to the website. For example, the Web browser will create a new tab for the request. In this case, the token saved in the cookie will be sent along with the request. Due to the existence of the token, the website will mistakenly believe that the received request is a legal request by the authenticated user, thereby providing the user's personal information to the attacker.

A plurality of solutions have been proposed to handle CSRF attacks. For example, the website may require provision of additional identity authentication information upon receipt of each request, e.g., authentication code. For another example, the website may shorten the life cycle of the session cookie and/or token. It would be understood that these manners will increase user burden and cause negative user experience. Some other solutions use a particular private token for some or all user requests. For example, each uniform resource locator (URL) in the web page may be provided a corresponding token. However, the huge number of tokens will increase the overheads at the server and the client, and some tokens may be rarely or even never used. Therefore, this solution cannot work effectively in various network environments, e.g., Web 2.0.

SUMMARY

Generally, embodiments of the present invention provide a solution for protecting network communication security.

In one aspect, embodiments of the present invention provide a method for protecting network communication security at a server. The method comprises: in response to a request from a client, determining whether a token from the client is included in a valid token queue, the valid token queue being a First-In-First-Out queue; in response to the token being included in the valid token queue, managing the valid token queue based on a position of the token in the valid token queue; and sending a response to the client based on the managing of the valid token queue.

In another aspect, embodiments of the present invention provide an apparatus for protecting network communication security at a server. The apparatus comprises: a token verifying unit configured to, in response to a request from a client, determine whether a token from the client is included in a valid token queue, the valid token queue being a First-In-First-Out queue; a token managing unit configured to, in response to the token being included in the valid token queue, manage the valid token queue based on a position of the token in the valid token queue; and a response sending unit configured to send a response to the client based on the managing of the valid token queue.

It would be understood through the following description that according to the embodiments of the present invention, the server may dynamically generate a token and inform the client to replace the previous token with the new token. At the server side, it is allowed to maintain two or more tokens simultaneously valid. As the client uses a newly generated token to communicate with the server, one or more tokens generated earlier will be invalid accordingly. Such dynamic token update can effectively block CSRF attacks and enhance network communication security. Meanwhile, a plurality of valid tokens guarantee that frequent token verification failure due to causes such as network delay will not occur. According to the embodiments of the present invention, it is only needed to manage a relatively small number of tokens, such that the burdens for the server and client are relatively light. Besides, the update and replacement of a token is implemented in a user-transparent manner, which will not cause any adverse impact on user experience. Other features and advantages of the present invention will become easily comprehensible through the description infra.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

In respective figures, same or like reference numerals are used to represent the same or like components.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
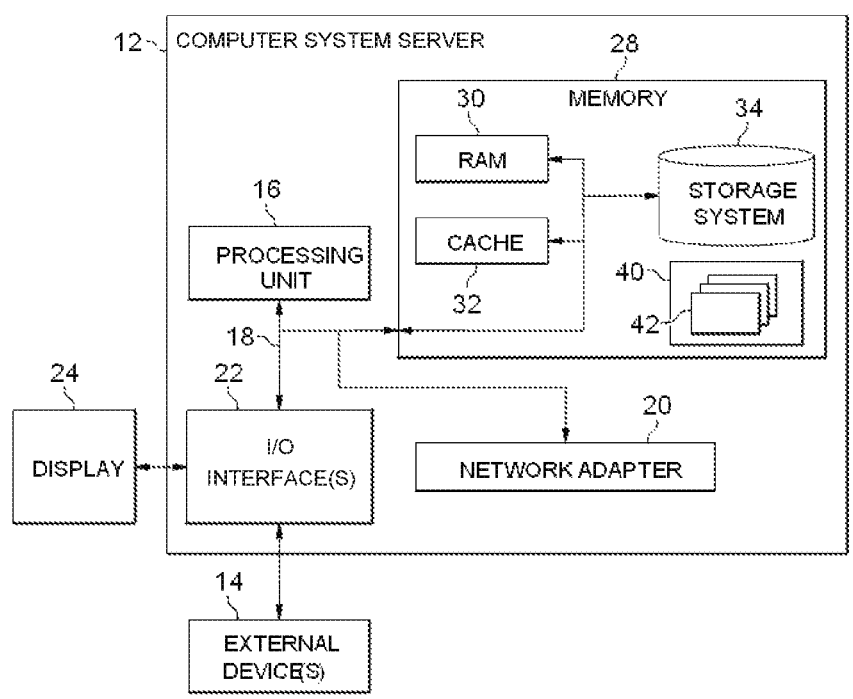
FIG. 1 shows an exemplary computer system/server which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Hereinafter, the mechanism and principle of the embodiments of the present invention will be described in detail. Unless otherwise stated, terms such as "first," "second," and "third" used hereinafter and in the claims are only for distinguishing different described obj ects, not intended to limit any temporal or spatial sequence. In addition, the term "based on" used hereinafter and in the claims expresses "at least partially based on." The term "comprise" or "include" or a similar expression indicates an open inclusion, i.e., "including, but not limited to . . . ." The term "plural" or a similar expression indicates "two or more." The term "one embodiment" indicates "at least one embodiment." The term "another embodiment" indicates "at least one another embodiment." Definitions of other terms will be provided in the description infra.

Figure 2:
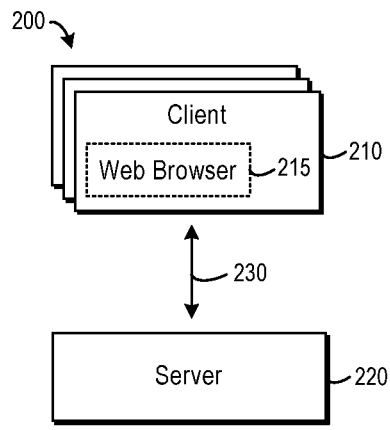
FIG. 2 shows a schematic block diagram of a network environment in which embodiments may be implemented therein according to the embodiments of the present invention.

FIG. 2 shows an exemplary block diagram of an environment 200 in which the embodiments of the present invention may be implemented. As shown in the figure, generally, the environment 200 comprises one or more clients 210 and one or more servers 220. The client 210 and the server 220 may communicate with each other via a network connection 230.

The client 210 may be any appropriate device. For example, the example of the client 210 includes, but not limited to, one or more of the following: a personal computer (PC), a laptop computer, a tablet computer, a mobile phone, a personal digital assistant (PDA), etc.

In particular, in some embodiments, on the client 210 may run a Web browser. In one embodiment, the Web browser 215 may be a stand-alone running application, e.g., Internet Explorer. In another embodiment, the Web browser 215 may be a component embedded in other application. The user of the client 210 may perform network communication with the server 220 via a Web browser.

The server 220 is any appropriate device that may communicate with the client 210 and provide servers to the client 210. For example, examples of the server 220 include, but not limited to, one or more of the following: a host, blade server, PC, router, switch, laptop computer, tablet computer, etc. In some embodiments, the server 220 may also be implemented as a mobile device.

The network connection 230 is any appropriate connection or link that supports bi-directional data communication between the client 210 and the server 220. According to the embodiments of the present invention, the network connection 230 may be a wired connection or a wireless connection. Examples of the network connection 230 include, but not limited to, one or more of the following: a computer network such as a local area network (LAN), a wide area network (WAN), an Internet, and the like, a telecommunications network such as 2G, 3G, or 4G, and a near field communication network, etc.

As already known, in operation, the user may send a request for establishing a network session to the server 220 via the network connection 230 using the client 210 (in particular, the Web browser 215 running on the client 210). As a response, the server 220 authenticates the user's identity. If the authentication passes, the server 220 may generate a token and return the token to the client 210. As already known, the token is a voucher indicating that the user has passed identity authentication. The token may has a specific life cycle.

The client 210 may store the token locally. For example, in one embodiment, the token may be stored in a cookie or a Web page by a Web browser 215. Afterwards, when the client 210 sends a request to the server 220, the token will be sent to the server 220 along with the request. The server 220 may determine whether the request is legitimate through verifying the validity of the token.

Figure 3:
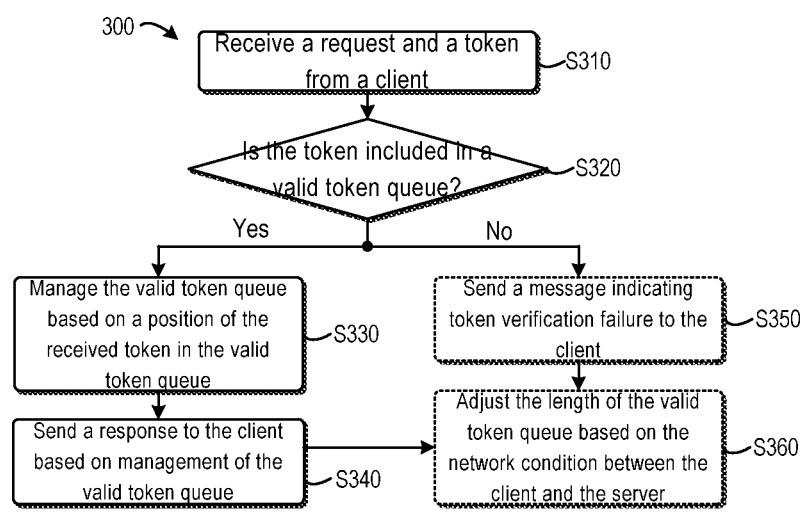
FIG. 3 shows a schematic flow diagram of a method for protecting network communication security at a server according to the embodiments of the present invention.

As stated above, in the traditional solution, a CSRF attack may perform an illegal action by forging a request from a legal user, for example, stealing user information. In this regard, according to the embodiments of the present invention, tokens may be dynamically updated and replaced, such that the client 210 and the server 220 user a predetermined number of tokens generated previously to perform a secure network communication. FIG. 3 shows a schematic flow diagram of a method 300 for protecting network communication security at a server 220 according to the embodiments of the present invention.

The method 300 starts from step S310. In step S310, a request and a token from the client 210 are received at the server 220. The request may be any request or command for any data, information, operation, and/or service, e.g., form submission, etc.

As stated above, the token is generated by the server 220 and provided by the client 210. In one embodiment, the token and the request may be sent to the server 220 together. For example, the token may be sent as a parameter of a request. In such an embodiment, in step S310, the token may be extracted from the received request message. Alternatively the token and the request may also be sent to the server 220 through an independent message. The scope of the present invention is not limited in this aspect.

The method 300 then proceeds to step S320. Here, the server 220 verifies the validity of the token from the client 210. Specifically, according to the embodiments of the present invention, verifying the validity of the token comprises determining whether the token is included in a valid token queue maintained at a server 220.

According to the embodiments of the present invention, the valid token queue maintained by the server 220 for each session is used for storing currently valid or active two or more tokens. These tokens are stored in the valid token queue in a First-In-First-Out (FIFO) manner according to the generation time. In other words, according to the embodiments of the present invention, the valid token queue is an FIFO queue. The length of the valid token queue is greater than or equal to 2, such that the server 220 allows that a plurality of tokens maintain valid simultaneously. The valid token queue may be implemented through any appropriate data structure such as linked list, array, table and the like.

In step S320, the server 220 determines whether the token received in step S210 is included in the valid token queue. If yes, it is believed that the received token is valid. Correspondingly, the method 300 proceeds to step S330, in which the valid token queue is managed based on the position of the received token in the valid token queue.

According to the embodiments of the present invention, in general, if the position of the token received in step S310 in the valid token queue is close to the end of the queue, it indicates that the token is lately generated. Therefore, it may be determined that the client 210 has successively received and starts using the token newly generated by the server 220. Correspondingly, in step S330, the server 220 may generate one or more new tokens, and update the valid token queue with the newly generated tokens.

As stated above, the valid token queue is a FIFO queue. In this way, the newly generated token is inserted at the rear part of the valid token queue. If the idle positions at the rear part of the valid token queue are insufficient, a corresponding number of tokens at the front part of the queue may be removed, and other existing tokens in the queue are shifted towards the front part in succession. It would be appreciated that the tokens stored in the front part of the valid token queue are old tokens generated by the server 220 previously. Therefore, by removing one or more tokens in the front part of the queue, these old tokens will become invalid. With such dynamic update of tokens, any subsequent request containing the removed tokens will not be authorized to execute.

On the other hand, if it is determined that the position of the received token in the valid token queue is relatively far from the end of the queue, it indicates that the token was generated by the server early. Therefore, it may be determined that the server 220 has generated a new token for replacing the token, and the currently received request and token are sent by the client 210 before receiving a new token. At this point, it would be unnecessary to re-generate a new token. Correspondingly, in step S330, the server 220 may keep the valid token queue unchanged.

A specific example is discussed with reference to FIG. 4. For the convenience of discussion, in FIG. 4 and other examples in the present disclosure, suppose the left part of the valid token queue is the front part for storing relatively old tokens, while the right part is the rear part for storing relatively new tokens. It would be appreciated that such arrangement is only exemplary, not intended to limit the embodiments of the present invention in any manner.

Figure 4:
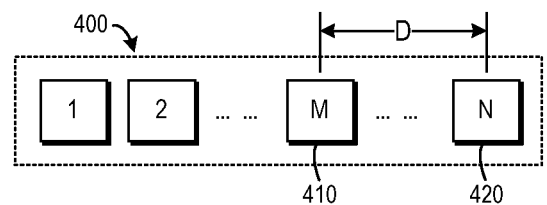
FIG. 4 shows a schematic diagram of an example of a valid token queue maintained by a server according to the embodiments of the present invention.

In the example of FIG. 4, the length of the valid token queue 400 maintained by the server 220 is N, wherein N is a natural number greater than or equal to 2. In other words, in this example, there may exist at most N valid tokens.

Suppose the token received from the client 210 in step S310 is the M$^{th}$ token in the valid token queue, wherein M is a natural number between [1, N].

In step S330, distance D of the position of the received token in the valid token queue 400 from the end of the queue 400 is determined. The term "end" used here refers to the last token position 420 in the valid token queue 400. In one embodiment, the "distance" between two positions may be determined based on the numbers of the token positions between the two positions. Namely, the distance D is defined as: D=N−M. In this way, if the received token is located at the end of the queue, then positions 410 and 420 overlap, and the distance therebetween is D=N−M=0; if the position 410 is immediately adjacent to the end 420 of the queue, then the distance D =N−M=1; so on and so forth.

In one embodiment, if the distance D between the position 410 of the received token and the queue end 420 is greater than or equal to a threshold distance, it indicates that the received token is an old token that will become invalid, and the server 220 has generated a new token for replacing the token. In this case, the valid token queue 400 maintains unchanged.

In one embodiment, the distance D if the distance D between the position 410 of the received token and the queue end 420 is smaller than a threshold distance, it may be determined that the received token is lately generated by the server 220 and already starts being used by the client 210. In this case, in one embodiment, the server 220 may generate one or more new tokens, and the valid token queue 400 may be updated with the newly generated tokens. Specifically, these new tokens will be inserted into the rear part of the valid token queue 400. If the idle positions at the rear part of the valid token queue 400 are insufficient, according to the FIFO mechanism, a corresponding number of old tokens in the front part of the valid token queue 400 will be removed, and other tokens are shifted to the front part in succession.

Particularly, in one embodiment, the threshold distance may be selected to be 1. In this case, only when the distance D between the position of the received token and the queue end 420 is less than 1 (i.e., equal to 0), will the server 220 generate a new token and update a valid token queue. In other words, in this embodiment, update of the valid token queue will only occur when the following two conditions are satisfied simultaneously: (1) the valid token queue has been full; and (2) the received token is the last token in the valid token queue.

Alternatively or additionally, in some embodiments, the number of the newly generated token is limited to 1. In other words, the server 220 only generates one token each time of updating the valid token queue. In this way, in one embodiment, each time the server 220 first receives a token at the end 420 of the valid token queue 400, a new token is generated and inserted into the valid token queue 400. Correspondingly, the previously first token in the valid token queue 400 will be removed.

In this way, the embodiments of the present invention may guarantee that when the client already starts using the newly generated token, a previously generated old token will become invalid accordingly. Through such dynamic token update mechanism, the life cycle of the token can be effectively shortened, thereby lowering the risk of CSRF attacks and enhancing network communication security. Besides, when the valid token queue is updated, only the old tokens, not all tokens, are removed, such that the number of valid tokens is more than 1. In this way, unnecessary token verification failure caused by network delay or other factors can be prevented. A specific example in this aspect will be further described in detail.

Continue reference to FIG. 3. In step S340, the server 220 sends a response to the client 210 based on the managing of the valid token queue in step S330. The response may include feedback to the request received in step S310, e.g., the requested data and the like. It is already known, and will not be detailed here.

In particular, if the valid token queue is updated in step S330, in step S340, the server sends the newly generated one or more tokens to the client 210. After receiving the new token, the client 210 may store the new token locally to replace the previously stored token. In subsequent network communication, the client 210 will use a new token. In this way, a malicious party intercepting and stealing the previous token will be unable to perform a CSRF attack to the user.

Return to step S320. If the server 220 determines that the token received in step S310 is not included in the valid token queue, then the token verification fails. In other words, the received token already became valid. In this case, the method 300 proceeds to step S350, where a message indicating failure of token verification is sent to the client. Different from the traditional solutions, according to the embodiments of the present invention, instead of directly rejecting the request, the server 220 may indicate the client 210 that the token fails verification and asks the client 210 to re-send the request and token.

Such practice is advantageous. In some cases, due to various reasons such as bad network condition, a legal request sent by the client 210 earlier likely suffers from a period of latency before arriving at the server 220. During this period of latency, token update likely already occurred, such that the valid token already becomes invalid when the request is sent. By granting the client 210 an opportunity for re-sending the request in step S350, rejection of a legal request due to a relatively long network transmission latency can be avoided.

Of course, it should be understood that step S350 is not must (shown in dotted lines in the figure). For example, in some embodiments, the user's request may be directly rejected, or any other appropriate error handing action may be adopted. The scope of the present invention is not limited in this aspect.

Alternatively, in one embodiment, the method 300 may also proceed, for example, from step S340 or step S350 to step S360, in which a length of the valid token queue is adjusted based on a condition of the network connection 230 between the client 210 and the server 220. Generally speaking, when the condition of the network connection 230 is good, the length of the valid token queue can be reduced. Otherwise, when the condition of the network connection 230 is poor, the length of the valid token queue may be increased.

Such practice is based on the following consideration: if the condition of the network connection 230 between the client 210 and the server 220 is not so ideal, mass requests sent by the client 210 likely arrive at the server 220 after the corresponding tokens have become invalid, which would cause a great amount of token verification failures and possible request re-transmission, thereby causing adverse impact on the network communication performance. In this case, by increasing the length of the valid token queue in step S370, the valid time for an old token can be prolonged. As such, too many request re-transmissions can be avoided.

According to the embodiments of the present invention, any currently known or future developed technologies may be employed to determine or estimate the condition of the network connection 230. Examples of such technologies include, but not limited to: detecting the network speed, packet loss rate, packet re-transmission rate, and the like, of the network connection 230. In particular, it would be appreciated that the condition of the network connection 230 may be a relative condition, dependent on the communication frequency between the client 210 and the server 220. For example, when the network speed keeps unchanged, when the communication frequency between the client 210 and the server 220 increases, the relative condition of the network connection 230 will be deteriorated accordingly.

In order to weigh the relative condition of the network connection 230 more accurately, in one embodiment, the condition of the network connection 230 may be estimated at least partially based on a count of token verification failures within a predetermined period of time. Specifically, the server 220 may maintain a dedicated counter for accumulating the times of token verification failures already occurring within a previous period of time. Each time the token verification fails, the count increments; each time the token verification succeeds, the count decrements.

When the counts of token verification failures within a predetermined period of time exceeds a predetermined threshold number, it indicates that the condition of network connection 230 is bad. At this point, the length of the valid token queue may be increased to appropriately prolong the valid time of old tokens. Otherwise, when the counts of token verification failures drops below the threshold number, it indicates that the condition of the network connection 230 is good. At this point, the length of the valid token queue may be reduced to raise the token update frequency.

By flexibly adjusting the length of the valid token queue, a relative condition of the network connection 230 between the client 210 and the server 230 can be adapted better, thereby significantly reducing the times of request re-transmissions. However, step S360 is not must (shown in dotted lines in the figure). For example, in one embodiment, the length of the valid token queue maintained by the server 220 may be constantly fixed.

It should be understood that the execution order of respective steps shown in FIG. 3 is only exemplary, not intended to limit the scope of the present invention in any manner. For example, in one embodiment, when the token passes verification, step S360 may be performed first to adjust the length of the valid token queue, and then steps S330 and S340 are performed. Similarly, steps S350 and S360 may be executed in any order.

Figure 5:
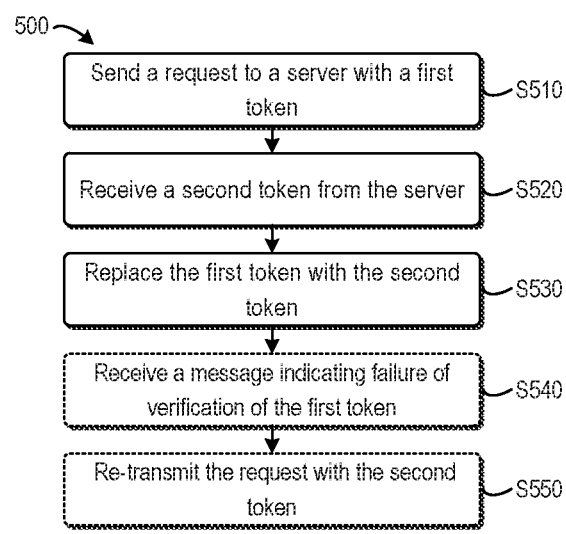
FIG. 5 shows a schematic flow diagram of a method for protecting network communication security at a client according to the embodiments of the present invention.

Now, refer to FIG. 5, in which a schematic flow diagram of a method for protecting network communication security at a client according to the embodiments of the present invention is presented. The method 500 starts from step S510, in which a request and a token is sent to the server. For the convenience of description, the token is called "a first token." As stated above, the first token was previous generated by the server 220 and provided to the client 210. For example, the first token may be stored in the cookie of the Web browser 215. In one embodiment, the first token may be sent as a requested parameter.

The request and the first token sent in step S510 will be received and processed by the server 220. If the first token is included in the valid token queue, and the update conditions for the valid token queue are not satisfied, then the client 210 will receive a conventional response to the request from the server 220, which is known and will not be detailed here.

In some other conditions, the client 210 receives a new token (called "a second token") from the server 220 in step S520. Next, in step S530, the client 210 stores the received second token locally, e.g., in the cookie of the Web browser 215, to replace the first token. In subsequent network communication, the client 210 will use the second token until it is replaced by a new token.

It would be appreciated from the above description that in step S250, the client 210 possibly receive the second token from the server 220 in various scenarios. For example, if the first token is valid, and the update conditions for the valid token queue are satisfied, the server 220 may generate and send a new second token. In this case, in step S520, the second token is received by the client 210 along with a response to the request sent in step S510.

Another possible scenario is that the second token received in step S520 is generated by the server 220 with respect to a certain request previously sent by the client 210. At this point, when the client 210 receives the second token, the response to the request sent in step S510 might not arrive at the client 210 yet. In this case, if the first token still maintains valid when arriving at the server 220, then the client will receive from the server 220 a conventional response to the request, which will not be detailed here. In other words, if the first token already became invalid upon arrival at the server 220, as stated above, the server 220 will send to the client 210 a message indicating failure of verifying the first token. The message is received by the client 210 in step S540.

As a response, the client 210 may re-transmit the request to the server 220 in step S550. At this point, the token sent along with the request is a valid token (i.e., second token) currently stored in the client 210 locally. In this way, the re-transmitted request may be correctly processed at the server 220.

Similar to step S350 described with reference to FIG. 3, steps S540 and S550 of the method 500 are optional and are therefore shown in dotted lines in the figure. As stated above, in one embodiment, the server 220 may directly reject the request in the case of token verification failure, granting no opportunity to the client to re-transmit the request.

Hereinafter, a specific example will be described with reference to FIG. 6. In particular, in the example described infra, the length of the valid token queue maintained at the server 220 is 2, and the threshold for updating the valid token queue is 1. In other words, in the exemplary embodiment below, at most two simultaneously valid tokens are present. Moreover, when and only when the received token is at the end of the valid token queue, will the valid token queue be updated.

Figure 6:
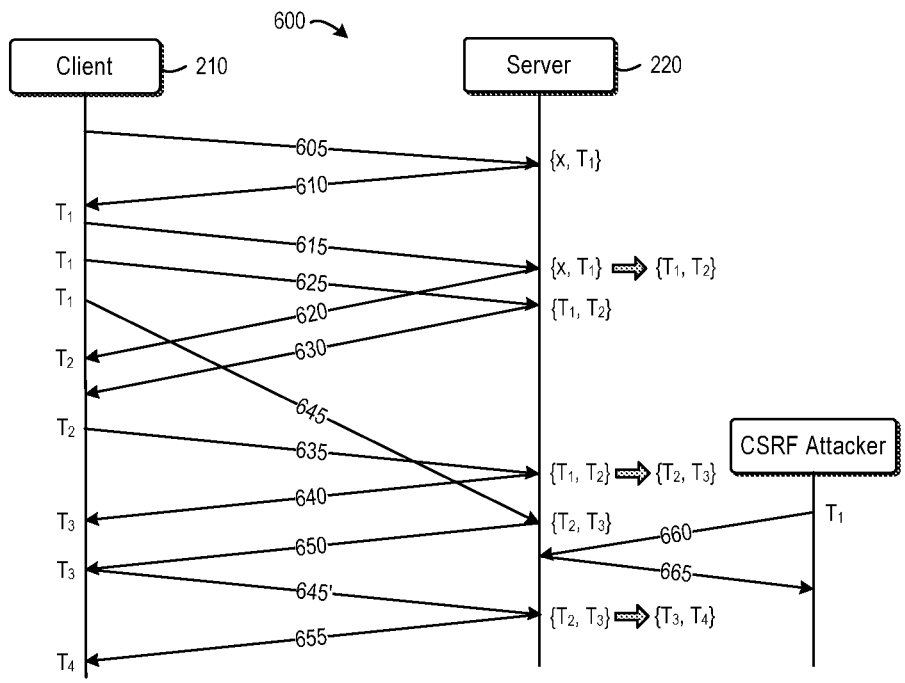
FIG. 6 shows an interactive diagram of a network communication between a client and a server according to the embodiments of the present invention.

Specifically, FIG. 6 shows an interactive diagram of a network communication between a client and a server according to the embodiments of the present invention. As shown in the figure, the client 210 sends a request 605 for establishing a network session to the server 220. The server 220 authenticates the user identity, and generates a token $T_1$ in response to a successful authentication. The token $T_1$ is inserted into the valid token queue. In particular, based on the FIFO principle, the token $T_1$ will be arranged at the end in the valid token queue. At this point, the valid token queue may be expressed as $\{X, T_1\}$, wherein "X" represents an empty position. The token $T_1$ is returned to the client 210 by the server 220 in the message 610 and stored by the client 210.

Next, the client 210 sends a request 615 to the server 220. The request is attached with the token $T_1$. The server 220 determines that $T_1$ is included in the valid token queue $\{X, $T_1$} and is thus valid. At this point, the distance of $T_1$ from the end of the queue is 0, smaller than the threshold distance 1. Thus, the server 220 generates a new token $T_2$ and inserts $T_2$ into the valid token queue. Because the length of the valid token queue is 2 in this example, the token $T_2$ will be arranged at the rea end of the queue, and the token $T_1$ is shifted to the front accordingly. In this way, the valid token queue {X, $T_1$} is updated to {$T_1$, $T_2$}, such that tokens $T_1$ and $T_2$ are simultaneously valid within a period of time.

A response 620 to the request 615 is sent to the client 210 from the server 220. The response 620 contains the newly generated token $T_2$. After receiving the response 620, the client 210 may extract the new token $T_2$ and replace the previous token $T_1$ with the new token $T_2$. Then, the client 210 will use the token $T_2$ in the message sent to the server 220, till it is replaced by a new token received from the server 220.

In this example, suppose a further request 625 is sent by the client 210 to the server 220 before the response 620 is received by the client 210. Because the client has not received the newly generated token $T_2$ yet at this point, the token sent along with the request 625 is still token $T_1$. The server may determine that the token $T_1$ sent along with the request 625 is still valid. Correspondingly, the server 220 normally processes the request 625 through sending the response 630. However, at this point, the distance of the token $T_1$ from the end 1, which is not smaller than the threshold distance 1. Therefore, the server 220 will not generate any new token. In other words, the valid token queue maintains unchanged at this point, still {$T_1$, $T_2$}.

When the client subsequently sends another request 635, it is the updated token $T_2$ that is sent along with the request. Responsive to receipt of the request 635, the server 220 determines that the token $T_2$ is included in the valid token queue {$T_1$, $T_2$}, and is thus valid. At this point, the token $T_2$ is at the end of the valid token queue, which satisfies the update conditions. Therefore, the server 220 may generate a further new token $T_3$ and updates the valid token queue with $T_3$. Specifically, the valid token queue is updated from {$T_1$, $T_2$} to {$T_2$, $T_3$}, wherein the latest token $T_3$ is inserted into the end of the queue, and the second latest token $T_2$ is shifted to the head of the queue, while the old token $T_1$ previously at the head of the queue is removed and thus becomes invalid. The newly generated token $T_3$, along with the response 640, is provide to the client 210. The client 210 replaces the token $T_2$ with the token $T_3$, thereby accomplishing further update of the token.

In subsequent communication, the client 210 communicates with the server 220 using the token $T_3$. It would be appreciated that, similar to the process described above, the server 220 will generate a new token $T_4$ when receiving the token $T_3$ for the first time and updates the valid token queue from {$T_2$, $T_3$} to {$T_3$, $T_4$}. In this way, token $T_4$ invalidates token $T_2$, token $T_5$ invalidates $T_3$, while token $T_6$ invalidates token $T_4$, so on and for forth.

Continue reference to FIG. 6, in which a potential impact on the network communication incurred by network latency will be discussed. Suppose a request 645 is a legal request earlier issued by the client 210; the token sent along with the request 645 is $T_1$. Due to a rather long network latency time, when the request 645 arrives at the server 220, as shown in FIG. 6, the valid token queue is {$T_2$, $T_3$}. Token $T_1$ is not included in the valid token queue and thus cannot pass the verification. As stated above, in one embodiment, the server 220 may send to the client 210 a message 650 indicating token verification failure.

As a response, the client 210 will re-transmit the request 645'. At this point, the token sent along with the request 645' is the valid token $T_3$ as currently stored by the client 210. Therefore, the server 220 will correctly process the request 645' and sends a response 655. In particular, since the received token $T_3$ lies in the end of the valid token queue {$T_2$, $T_3$}, the server 220 will generate a new token $T_4$ and update the valid token queue to {$T_3$, $T_4$}. Therefore, the response 655 will contain the new token $T_4$, such that the client 210 accomplishes a new round of token update.

Through dynamic token update, the token cycle may be shorted in a user-transparent manner. In this way, the probability for an attacker to successfully steal a legal valid will be greatly reduced, thereby effectively alleviating CSRF attacks. As an example, as shown in FIG. 6, suppose the CSRF attacker sends an illegal request 660 with the token $T_1$. At this point, the valid token queue is {$T_2$, $T_3$}, such that the token $T_1$ cannot pass the verification, and the illegal request 660 will be rejected.

In one embodiment, as indicated above, the server 220 may sends a message 665 indicating the token verification failure to the CSRF attacker 610. However, the CSRF attacker cannot respond to the message like a legal client 210, thereby the attack fails.

Moreover, even if the CSRF attacker launches another attack by sending a new CSRF message or attempting to intercept the updated valid token, the probability of successful CSRF attack will also be lowered significantly, because according to the embodiments of the present invention, the valid token queue is always in a constant dynamic update. Additionally, as stated above, the token update is automatically executed at the end, without need of the user to input any additional information, or dampening user experience in any other manner.

It should be understood that the valid token queue with a length of 2 as described in FIG. 6 is only for illustration purposes. As stated above, the valid token queue may have any length of greater than or equal to 2. The scope of the present invention is not limited in this aspect.

Figure 7:
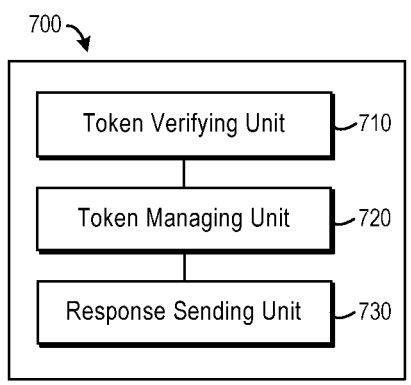
FIG. 7 shows a schematic block diagram of a system for protecting network communication security at a server according to the embodiments of the present invention.

FIG. 7 shows a schematic block diagram of an apparatus 700 for protecting network communication security at a server according to the embodiments of the present invention. As shown in the figure, the apparatus 700 comprises: a token verifying unit 710 configured to, in response to a request from a client, determine whether a token from the client is included in a valid token queue, the valid token queue being a First-In-First-Out queue; a token managing unit 720 configured to, in response to the token being included in the valid token queue, manage the valid token queue based on a position of the token in the valid token queue; and a response sending unit 730 configured to send a response to the client based on the managing of the valid token queue.

In one embodiment, the token managing unit 720 may comprise: a new token generating unit configured to generate a new token in response to a distance of the position of the token in the valid token queue from an end of the valid token queue being less than a threshold distance; and a token updating unit configured to update the valid token queue with the new token. In this embodiment, the response sending unit may comprise a new token sending unit configured to send the new token to the client for subsequent use.

In one embodiment, the token managing unit 720 may comprise: a token keeping unit configured to keep the valid token queue unchanged in response to a distance of the position of the token in the valid token queue from an end of the valid token queue being greater than or equal to a threshold distance.

In one embodiment, the apparatus 700 may further comprise: a failure message sending unit configured to send to the client a message indicating failure of token verification in response to the token being not included in the valid token queue.

In one embodiment, the apparatus 700 may further comprise: a queue length adjusting unit configured to adjust a length of the valid token queue based on a condition of a network connection between the client and the server. In one embodiment, the apparatus may further comprise: a failure counting unit configured to determine counts of failure of token verification within a predetermined period of time to obtain the condition of the network connection.

Figure 8:
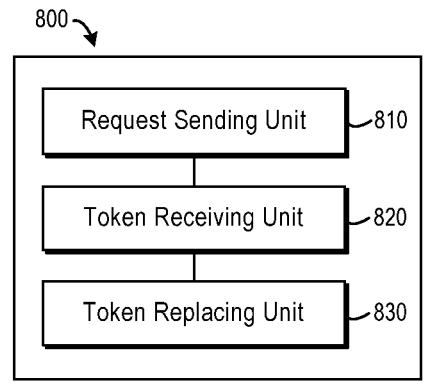
FIG. 8 shows a schematic block diagram of a system for protecting network communication security at a client according to the embodiments of the present invention.

FIG. 8 shows a schematic block diagram of an apparatus 800 for protecting network communication security at a client according to the embodiments of the present invention. As shown in the figure, the apparatus 800 comprises: a request sending unit 810 configured to send a request to the server using a first token, which first token is generated by the server and stored at the client; a token receiving unit 820 configured to receive a second token from the server; and a token replacing unit 830 configured to store the second token at the client to replace the first token.

In one embodiment, the apparatus 800 may further comprise: a response receiving unit configured to receive a second token along with a response to the request.

In one embodiment, the apparatus 800 may further comprise: a failure message receiving unit configured to receive a message indicating failure of verifying the first token; and a request re-transmitting unit configured to re-transmit the request to the server using the second token.

It should be noted that for the sake of clarity, FIGS. 7 and 8 do not show optional units or sub-units included in the apparatuses 700 and 800. All features and operations as described above are suitable for apparatuses 700 and 800, respectively, which are therefore not detailed here. Moreover, partitioning of units or subunits in apparatuses 700 and 800 is exemplary, rather than limitative, intended to describe its main functions or operations logically. A function of one unit may be implemented by a plurality of other units; on the contrary, a plurality of units may be implemented by one unit. The scope of the present invention is not limited in this aspect.

Moreover, the units included in the apparatuses 700 and 800 may be implemented by various manners, including software, hardware, firmware or a random combination thereof. For example, in some embodiments, the apparatus may be implemented by software and/or firmware. Alternatively or additionally, the apparatuses 700 and 800 may be implemented partially or completely based on hardware. for example, one or more units in the apparatuses 700 and 800 may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for protecting network communication security at a server by updating tokens in a valid token queue comprising a plurality of valid tokens that are maintained at the server, the method comprising:
   in response to a request from a client, determining, by the server, whether a token from the client is included in the valid token, the valid token queue being a first-in-first-out queue;
   in response to the token being included in the valid token queue, the server managing the valid token queue based on a position of the token in the valid token queue, wherein managing the valid token queue based on a position of the token in the valid token queue comprises:
      keeping the valid token queue unchanged in response to a distance of the position of the token in the valid token queue from an end of the valid token queue being greater than or equal to a threshold distance;
      generating a new token in response to a distance of the position of the token in the valid token queue from an end of the valid token queue being less than a threshold distance; and
      in response to generating the new token, updating the valid token queue with the new token when the token from the client is at the end of the valid token queue; and
   the server sending a response that includes the new token to the client based on the managing of the valid token queue.

2. The method according to claim 1, wherein sending a response to the client based on the managing of the valid token queue comprises:
   sending the new token to the client for subsequent use by the client in lieu the token.

3. The method according to claim 1, further comprising:
   sending to the client a message indicating failure of token verification in response to the token being not included in the valid token queue, wherein the message requests the client to re-send the request to the server.

4. A method for protecting network communication security at a server by adjusting a length of a valid token queue comprising a plurality of valid tokens that are maintained at a server, the method comprising:
   in response to a request from a client, determining, by the server, whether a token from the client is included in the valid token queue, the valid token queue being a first-in-first-out queue;
   in response to the token being included in the valid token queue, managing the valid token queue based on a position of the token in the valid token queue;
   sending a response to the client based on the managing of the valid token queue; and
   adjusting the length of the valid token queue based on a condition of a network connection between the client and the server;
   wherein managing the valid token queue based on a position of the token in the valid token queue further comprises keeping the valid token queue unchanged in response to a distance of the position of the token in the valid token queue from an end of the valid token queue being greater than or equal to a threshold distance, and wherein the valid token queue is updated with the new token when the token from the client is at the end of the valid token queue.

5. The method according to claim 4, further comprising:
   determining counts of failure of token verification within a predetermined period of time to obtain the condition of the network connection.

6. An apparatus for protecting network communication security at a server using a valid token queue comprising a plurality of valid tokens that are maintained at the server, the apparatus comprising:
   a token verifying unit configured to, in response to a request from a client, determine whether a token from the client is included in a valid token queue, the valid token queue being a first-in-first-out queue;
   a token managing unit configured to, in response to the token being included in the valid token queue, manage the valid token queue based on a position of the token in the valid token queue by keeping the valid token queue unchanged in response to a distance of the position of the token in the valid token queue from an end of the valid token queue being greater than or equal to a threshold distance, generating a new token in response to a distance of the position of the token in the valid token queue from an end of the valid token queue being less than a threshold distance, and in response to generating the new token, updating the valid token queue with the new token when the token from the client is at the end of the valid token queue; and
   a response sending unit configured to send a response that includes the new token to the client based on the managing of the valid token queue.

7. The apparatus according to claim 6, wherein the valid token queue comprises a plurality of valid tokens that are maintained at the server, and wherein the token managing unit comprises:
   a new token generating unit configured to generate a new token in response to a distance of the position of the token in the valid token queue from an end of the valid token queue being less than a threshold distance; and
   a token updating unit configured to update the valid token queue with the new token.

8. The apparatus according to claim 7, wherein the response sending unit comprises:
   a new token sending unit configured to send the new token to the client for subsequent use by the client in lieu the token.

9. The apparatus according to claim 6, wherein the token managing unit comprises:
   a token keeping unit configured to keep the valid token queue unchanged in response to a distance of the position of the token in the valid token queue from an end of the valid token queue being greater than or equal to a threshold distance.

10. The apparatus according to claim 6, further comprising:
    a failure message sending unit configured to send to the client a message indicating failure of token verification in response to the token being not included in the valid token queue.

11. The apparatus according to claim 6, further comprising:
    a queue length adjusting unit configured to adjust a length of the valid token queue based on a condition of a network connection between the client and the server.

12. The apparatus according to claim 11, further comprising:
    a failure counting unit configured to determine counts of failure of token verification within a predetermined period of time to obtain the condition of the network connection.

13. A computer program product for protecting network communication security by updating tokens in a valid token queue comprising a plurality of valid tokens that are maintained at the server, the computer program product comprising a non-transitory computer readable storage medium having computer readable program instructions embodied thereon for causing a processor to carry out steps of:
    in response to a request from a client, determining, by the server, whether a token from the client is included in the valid token queue, the valid token queue being a first-in-first-out queue;
    in response to the token being included in the valid token queue, managing the valid token queue based on a position of the token in the valid token queue, wherein managing the valid token queue based on a position of the token in the valid token queue comprises:
       keeping the valid token queue unchanged in response to a distance of the position of the token in the valid token queue from an end of the valid token queue being greater than or equal to a threshold distance;
       generating a new token in response to a distance of the position of the token in the valid token queue from an end of the valid token queue being less than a threshold distance; and
       in response to generating the new token, updating the valid token queue with the new token when the token from the client is at the end of the valid token queue; and
    sending a response that includes the new token to the client based on the managing of the valid token queue.

* * * * *